F. MARTINEZ.
VALVED CESSPOOL TRAP.
APPLICATION FILED JAN. 25, 1919.

1,320,883.

Patented Nov. 4, 1919.

Inventor:
Francisco Martinez
By Emil Rainelyke
Attorney.

UNITED STATES PATENT OFFICE.

FRANCISCO MARTINEZ, OF MEXICO, MEXICO.

VALVED CESSPOOL-TRAP.

1,320,883.  Specification of Letters Patent.  Patented Nov. 4, 1919.

Application filed January 25, 1919. Serial No. 273,059.

*To all whom it may concern:*

Be it known that I, FRANCISCO MARTINEZ, citizen of the United Mexican States, residing at Mexico, Federal District, Mexico, have invented certain new and useful Improvements in Valved Cesspool-Traps, of which the following is a specification.

This invention relates to a valved cesspool trap with strainer for sinks and lavatories, and the object is to provide a sink and lavatory trap adapted to be directly connected to a sewer and furnished with a valve so that it will hold the liquid in the scullery, lavatory, bath tub or any other receptacle, in the bottom of which the device is disposed, until it is desired to drain off the liquid.

The skirt or bell, commonly used in these traps, is furnished with a valve member. Simple means are provided for keeping the skirt in a raised position and therewith unseating the valve, in order that the liquid may flow out, although the trap is still effective.

Figure 1:
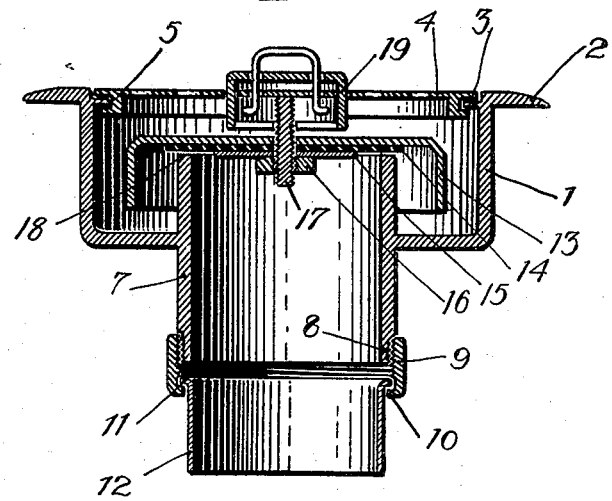
Figure 1 is a vertical cross section of the device.
Figure 2:
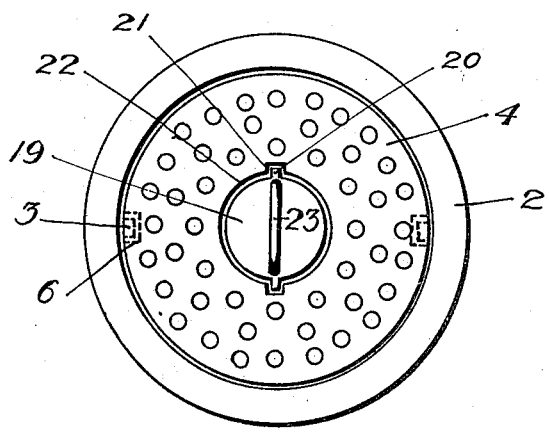
Fig. 2 is a top view of same.

Referring to the drawing, (1) is a drain bowl having an exterior annular flange (2) by which it rests on the bottom of a scullery or lavatory receptacle, or on the bottom of a bath tub.

Near the inner upper edge of said bowl two pins (3) project, on which the strainer (4) is resting. The strainer has an annular groove (5) and two notches (6), for the accommodation of the pins (3), that they may fit into the annular groove (5). A trap pipe (7) extends above the bottom of the drain bowl, with which it forms an integral part, and the lower end (8) of this pipe is threaded so as to receive the nut (9), which has an inwardly bent flange (10) to support and retain the outwardly bent flange (11) of a sleeve (12).

A lead pipe inserted in the sleeve (12) and flared out over the flange (11) of the sleeve may be engaged and sealed against the end (8) of the pipe (7), when the nut (9) is turned on. This disposition is not shown, being a well known manner of connecting. A skirt or bell (13) having an interior rubber disk (14) which is kept in place by the washer (15), nut (16) and screw (17), is adapted to rest on the upper end (18) of the trap pipe (7), like a valve member. The upper end of the screw (17) is fastened to a cap (19), provided with projections or ears (20), which when the skirt rests on the trap pipe seat (18) fit in the notches (21) extending from the central perforation (22) made in the strainer (4). A strap (23) detachable from the cap (19) is employed to raise the skirt (13) and by turning the cap (19) the ears (20) may rest on the strainer, keeping the skirt lifted above the valve seat, so that the rubber disk does not obstruct the escape of the liquid to the sewer.

If the liquid contains solids or wastes, parts thereof will be excluded by the strainer, and smaller parts will settle in the bowl, while the grease adheres to the skirt.

The liquid overflows under the skirt by the top (18) of the trap pipe (7) whenever the level is higher and the skirt is not set on said trap pipe (7).

Having thus described my invention what I claim is:

In a cess-pool trap, the combination of a drain bowl; a strainer seated in the top thereof and formed with a central opening having a pair of notches extending therefrom; a pipe projecting into the main bowl above the bottom thereof and rigidly connected to said bowl, the upper end of said pipe terminating short of said strainer; a bell adapted to rest centrally upon the top of said pipe to seal the same; and a cap for lifting the bell connected thereto and projecting vertically through the opening in the strainer, to be grasped by the operator, said cap having a pair of outwardly-extending ears which seat in said notches when the bell is in its position of rest and which are adapted to be raised through the notches when the bell is lifted and thereafter turned out of alinement with the notches so as to rest upon the strainer and support the bell in raised position.

In testimony whereof I have affixed my signature.

FRANCISCO MARTINEZ.

Copies of this patent may be obtained for five cents each, by addressing the "Commissioner of Patents, Washington, D. C."